US00RE37737E

(19) United States
(12) Reissued Patent
Yada

(10) Patent Number: US RE37,737 E
(45) **Date of Reissued Patent: *Jun. 11, 2002**

(54) AUTOMOBILE WINDSHIELD MOLDING AND METHOD OF PRODUCING THE SAME

(75) Inventor: Yukihiko Yada, Nagoya (JP)

(73) Assignee: Tokai Kogyo Kabushiki Kaisha, Ohbu (JP)

( * ) Notice: This patent issued on a continued prosecution application filed under 37 CFR 1.53(d), and is subject to the twenty year patent term provisions of 35 U.S.C. 154(a)(2).

This patent is subject to a terminal disclaimer.

(21) Appl. No.: 08/697,423

(22) Filed: Aug. 23, 1996

Related U.S. Patent Documents

Reissue of:
(64) Patent No.: 5,190,338
Issued: Mar. 2, 1993
Appl. No.: 07/755,847
Filed: Sep. 6, 1991

U.S. Applications:

(63) Continuation of application No. 08/397,763, filed on Mar. 2, 1995, now abandoned.

(30) Foreign Application Priority Data

Sep. 6, 1990 (JP) ..... 2-236396

(51) Int. Cl.[7] ..... B60J 10/02
(52) U.S. Cl. ..... 296/93; 264/40.7; 264/167; 264/177.16; 52/208; 52/204.597
(58) Field of Search ..... 52/204.591, 204.597, 52/208; 264/167, 177.16, 40.7; 296/93, 96.21

(56) References Cited

U.S. PATENT DOCUMENTS 4,165,119 A * 8/1979 Hedeen et al. ..... 296/93
4,358,917 A * 11/1982 Oda et al. ..... 296/93 X (List continued on next page.)

FOREIGN PATENT DOCUMENTS

| | | |
|---|---|---|
| JP | 57-54416 | 11/1982 |
| JP | 62-283017 | 12/1987 |

(List continued on next page.)

*Primary Examiner*—Dennis H. Pedder
(74) *Attorney, Agent, or Firm*—Oblon, Spivak, McClelland, Maier & Neustadt, P. C.

(57) ABSTRACT

[A]*An automobile* windshield molding [comprises] *seals* a [pair of extruded side molding parts, a pair of corner molding parts, and an extruded upper molding part integral with and extending] *space* between [the side] *a windshield* and [corner molding parts] *a periphery of a window opening of a vehicle body panel.* [Each of the] *The* molding [parts includes an exterior wing] *is extruded in a single piece* and [a connecting portion] *includes an exterior wing to cover the space on the exterior side of the vehicle body panel.* The exterior wing has an [outward wing portion and an] inward wing portion [for covering the] *which covers a* peripheral [edge of a vehicle body panel and a peripheral edge of a] *surface of an automobile* windshield[, respectively]. The inward wing portion [of each of the side molding part is increased its height to define a space between the peripheral surface of] *has an eaves which protrudes out over* the windshield [associated with a side panel. This space serves as a water drain channel for guiding rain water to a predetermined position]. *The eaves gradually becomes spaced further and further from the windshield thereby creating first water drain channels which begin approximately at first and second corner molding parts and extend towards first and second side molding parts of the windshield molding. The distance by which the eaves protrude out over the windshield gradually increases along the first and second side molding parts thus increasing the depth of the first water drain channels.*

21 Claims, 9 Drawing Sheets

*(AMENDED)*

U.S. PATENT DOCUMENTS

| | | | | | |
|---|---|---|---|---|---|
| 4,405,174 | A | * | 9/1983 | Yamane et al. | 296/93 X |
| 4,757,659 | A | * | 7/1988 | Miyakawa et al. | 296/93 |
| 4,757,660 | A | * | 7/1988 | Miyakawa et al. | 296/93 X |
| 4,858,988 | A | * | 8/1989 | Morgan et al. | 296/93 X |
| 4,865,796 | A | * | 9/1989 | Tamura et al. | 264/40.7 |
| 4,884,380 | A | | 12/1989 | Yada et al. | |
| 4,984,839 | A | * | 1/1991 | Miyakawa et al. | 296/96.21 X |
| 5,028,460 | A | * | 7/1991 | Kimura et al. | 296/93 X |
| 5,035,459 | A | | 7/1991 | Yada | |
| 5,044,684 | A | | 9/1991 | Yada | |
| 5,049,346 | A | | 9/1991 | Yada et al. | |
| 5,074,610 | A | * | 12/1991 | Tamura et al. | 296/93 |
| 5,078,444 | A | * | 1/1992 | Shirahata et al. | 296/93 |
| 5,094,498 | A | | 3/1992 | Yada | |
| 5,104,173 | A | * | 4/1992 | Tamura et al. | 296/208 X |
| 5,114,206 | A | | 5/1992 | Yada | |
| 5,149,168 | A | | 9/1992 | Yada et al. | |
| 5,174,623 | A | * | 12/1992 | Yada et al. | 296/93 |
| 5,174,624 | A | | 12/1992 | Yada et al. | |
| 5,222,336 | A | | 6/1993 | Yada et al. | |
| 5,233,805 | A | * | 8/1993 | Hirai et al. | 296/93 X |
| 5,297,843 | A | | 3/1994 | Yada et al. | |
| 5,310,236 | A | * | 5/1994 | Tamura et al. | 296/93 |
| 5,344,205 | A | | 9/1994 | Yada et al. | |
| 5,348,364 | A | | 9/1994 | Yada | |
| 5,350,211 | A | | 9/1994 | Yada et al. | |
| 5,389,423 | A | | 2/1995 | Yada | |
| 5,443,299 | A | | 8/1995 | Yada et al. | |
| 5,492,387 | A | | 2/1996 | Yada et al. | |
| 5,523,041 | A | | 6/1996 | Yada | |
| 5,534,316 | A | | 7/1996 | Yada et al. | |
| 5,588,691 | A | | 12/1996 | Yada et al. | |
| 5,607,197 | A | | 3/1997 | Yada | |
| 5,618,079 | A | | 4/1997 | Yukihiko et al. | |
| 5,628,948 | A | | 5/1997 | Yada et al. | |
| 5,656,223 | A | | 8/1997 | Yada et al. | |
| 5,718,470 | A | | 2/1998 | Yada et al. | |
| 5,795,597 | A | | 8/1998 | Yada | |
| 5,804,118 | A | | 9/1998 | Yada et al. | |
| 5,833,297 | A | | 11/1998 | Yada et al. | |
| 5,837,297 | A | | 11/1998 | Yada et al. | |

FOREIGN PATENT DOCUMENTS

| | | |
|---|---|---|
| JP | 62-289427 | 12/1987 |
| JP | 63-8019 | 1/1988 |
| JP | 63-291721 | 11/1988 |
| JP | 64-9811 | 1/1989 |
| JP | 64-28374 | 2/1989 |
| JP | 1-195032 | 8/1989 |
| JP | 1-128411 | 9/1989 |
| JP | 1-244820 | 9/1989 |
| JP | 1-269611 | 10/1989 |
| JP | 1-269612 | 10/1989 |
| JP | 1-269613 | 10/1989 |

* cited by examiner

FIG. 1
(AMENDED)
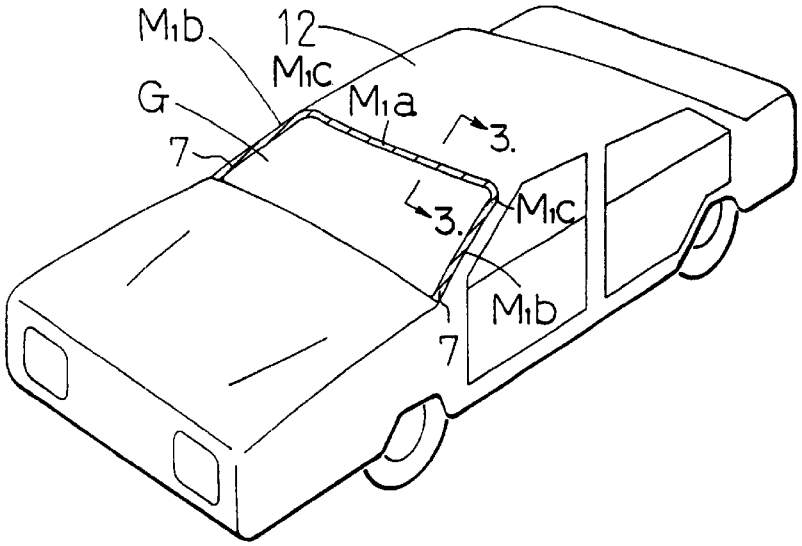

FIG. 3
(AMENDED)
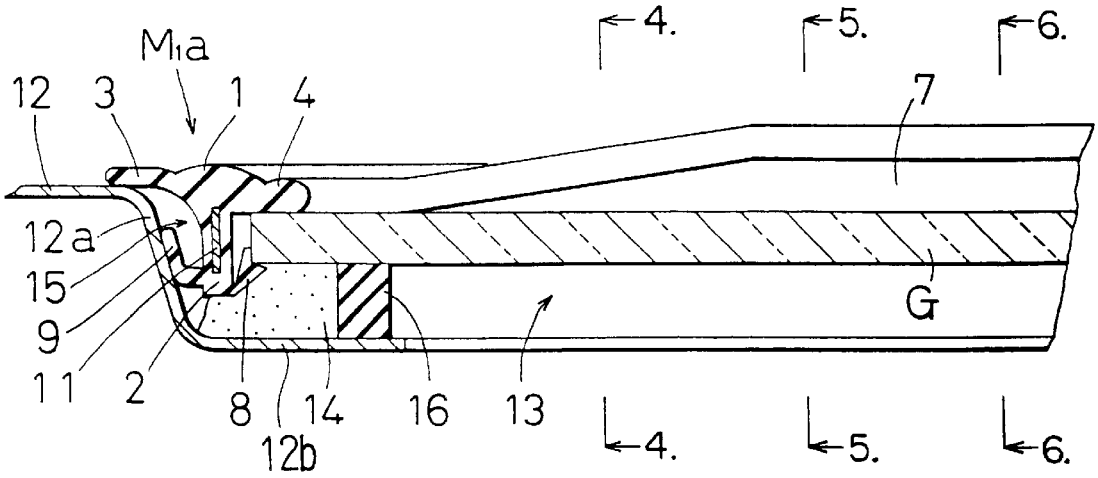

FIG. 7
*(AMENDED)*
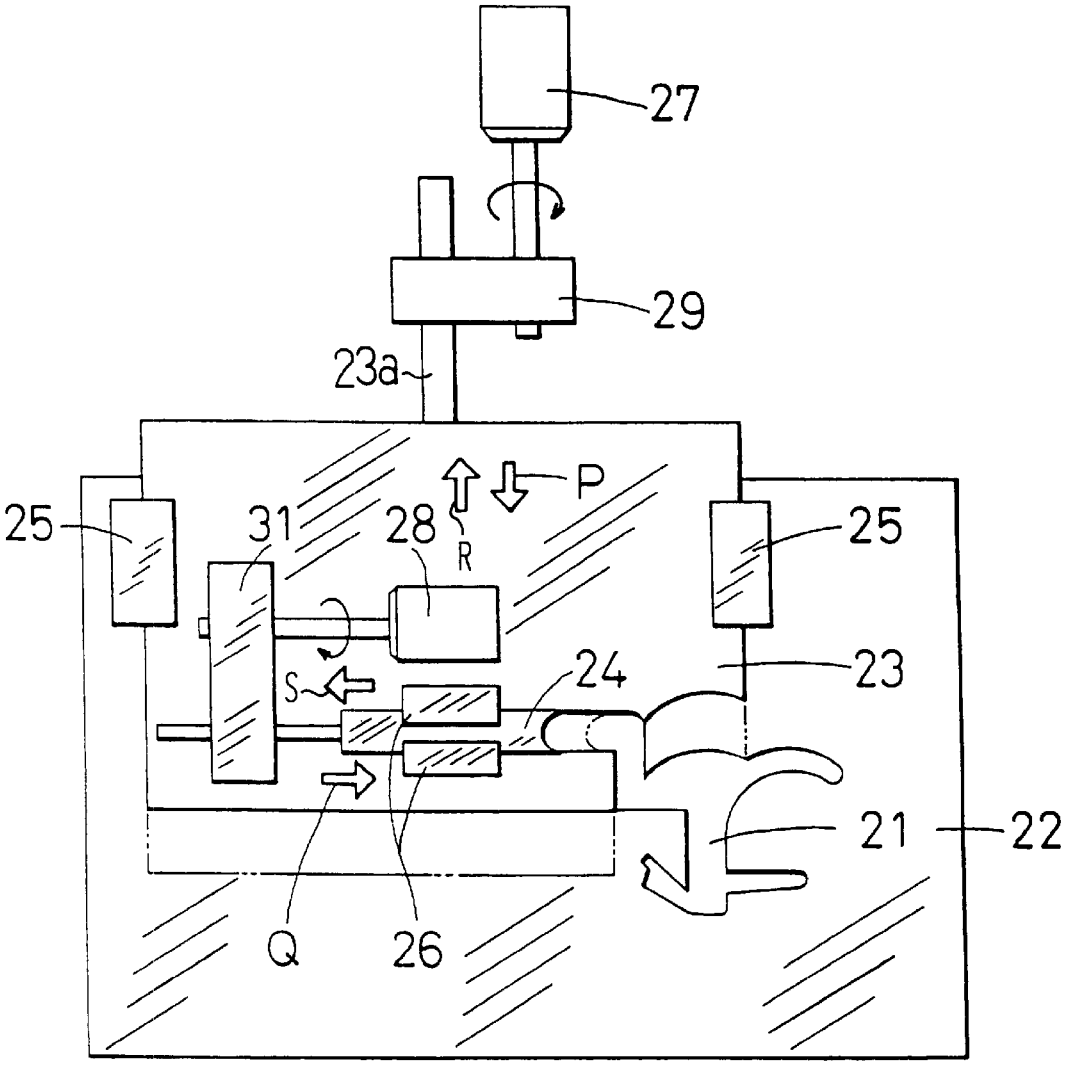

FIG. 10
(AMENDED)
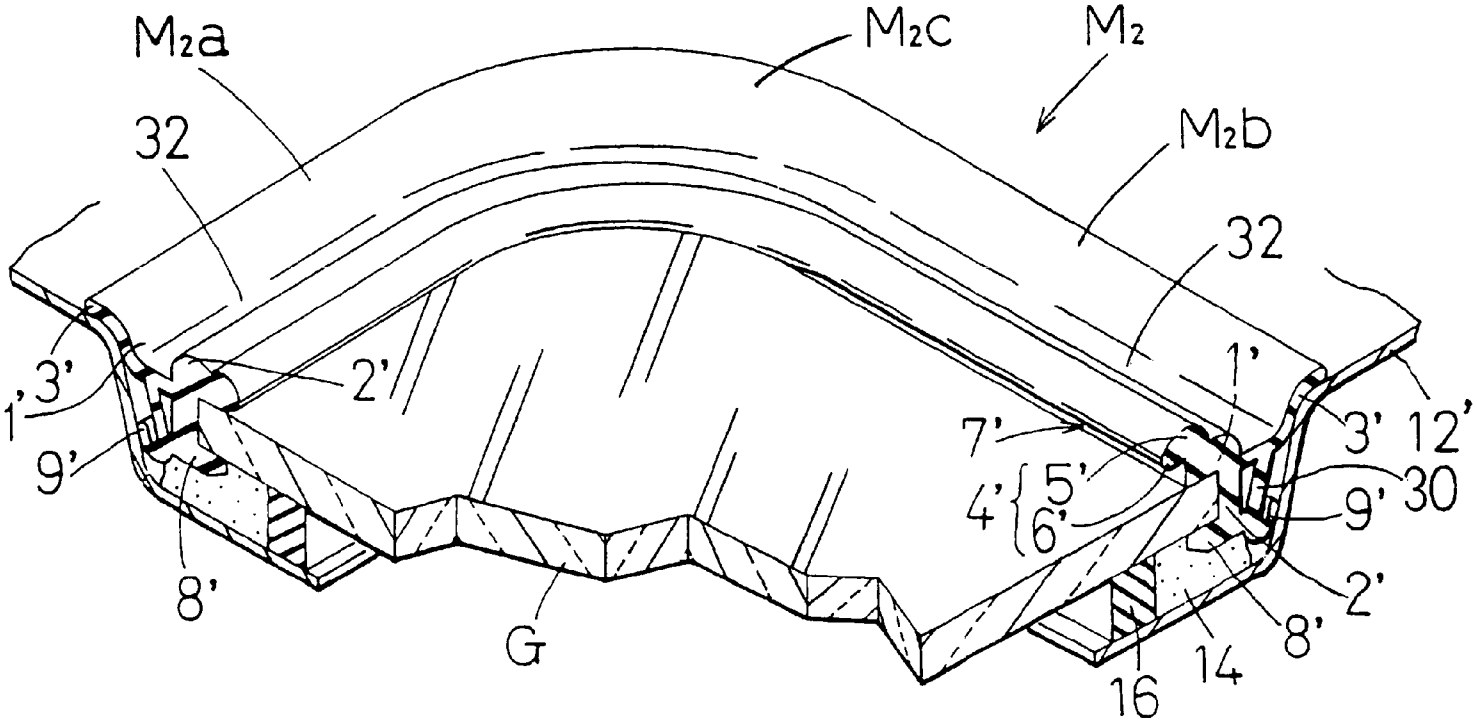

FIG. 11
*(AMENDED)*
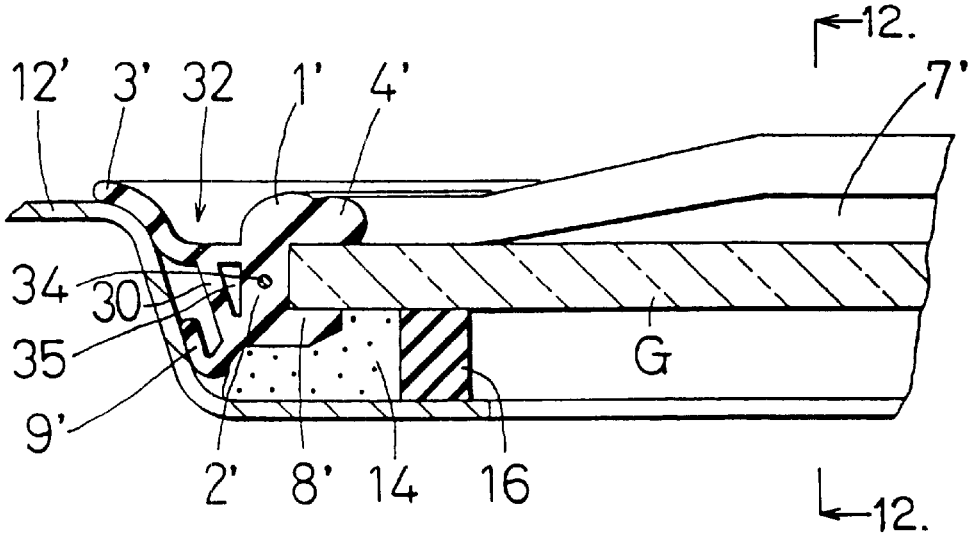
FIG. 12
*(AMENDED)*
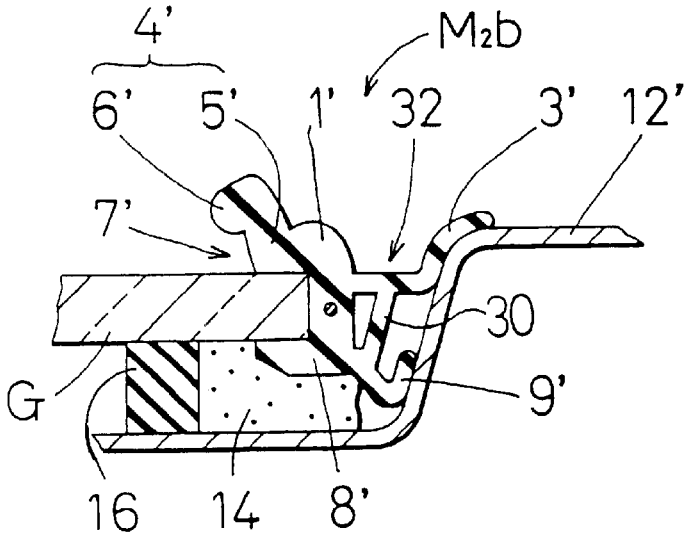

AUTOMOBILE WINDSHIELD MOLDING AND METHOD OF PRODUCING THE SAME

Matter enclosed in heavy brackets [ ] appears in the original patent but forms no part of this reissue specification; matter printed in italics indicates the additions made by reissue.

*This application is a continuation of application Ser. No. 08/397,763, filed on Mar. 2, 1995, now abandoned, which is a reissue application of Ser. No. 07/755,847, filed Sep. 6, 1991, U.S. Pat. No. 5,190,338.*

BACKGROUND OF THE INVENTION

1. Field of the Invention

This invention relates to a windshield molding for a motor vehicle to seal the space between a windshield and a periphery of a window opening of a vehicle body panel, and a method of producing such windshield molding.

2. Description of the Related Art

Usually a windshield molding is attached around an edge of a windshield to seal the space between a window opening of a vehicle body panel and the windshield. Such windshield molding comprises an exterior wing for covering a space, on the exterior side of the vehicle, between the window opening periphery of the vehicle body panel and the peripheral edge of the windshield, and a connecting portion extending from an interior side of the exterior wing through the space between the window opening periphery of the vehicle body panel and the edge of the windshield.

With this type windshield molding, water drain channels are formed on the molding as disclosed in Japanese Laid-Open Patent Publications Nos. 291721/1988 (corresponding to U.S. Pat. Nos. 4,757,659 and 4,757,660), 8019/1988, 8020/1988, 8021/1988, 212121/1988, 195032/1989 (corresponding to U.S. 4,865,796), 204713/1989 and 204714/1989.

With Japanese Patent Laid-Open Publication No. 291721/1988 (corresponding to U.S. Pat. Nos. 4,757,659 and 4,757,660) and Japanese Patent Laid-Open Publication No. 244,820/1989, a molding has a top and a leg extending downwardly from the top. The leg has a plurality of arms extending in the direction associated with a windshield, and terminates in a foot. At an upper molding part, the molding receives an upper edge of the windshield in a space between the underside of the top and a first arm. At each side molding part, each side edge of the windshield is received in a space between a second arm and the foot. At the side molding part, the space between the underside of the top and the first arm serves as a water drain channel. At the upper molding part, the portion of the leg which is not used for receiving the windshield is cut off.

Japanese Utility Model Laid-Open Publication No. 128411/1989 discloses an extruded joint to be used for connecting an upper molding part and a side molding part.

In Japanese Patent Laid-Open Publications 8019/1988, 8020/1988 and 8021/1988, a strip of a molding extruded in a predetermined shape has a groove along a side of a top decorative portion. The groove is formed by elastic deformation or heated compression molding process. This groove serves as a water drain channel.

Japanese Patent Laid-Open Publication No. 212121/1988 discloses a molded piece inserted under an arm of a connecting portion of the molding to raise an arm and to define a space, which is used as a water drain channel.

With Japanese Patent Laid-Open Publication No. 195032/1989 (U.S. Pat. No. 4,865,796), a whole molding is extruded in a predetermined uniform shape. A portion serving as a water drain channel is cut from the molding where the water drain channel is not necessary. Modified and improved examples of the molding of this citation are proposed in Japanese Patent Laid-Open Publications 204173 and 204174 of 1989.

However, the following inconveniences are experienced with the foregoing prior art moldings.

With Japanese Patent Laid-Open Publication No. 291721/1988 (U.S. Pat. Nos. 4,757,659 and 4,757,660), it is necessary to adjust the posture of the molding on its one side confronting the vehicle body panel and its other side confronting the windshield before the molding is installed in a window opening of the vehicle. This means there is still a space between the molding and the vehicle body panel, which will increase a windage resistance and adversely affect fuel efficiency of the vehicle. Further the extruded molding is cut at portions which are not necessary after the molding is produced, which is disadvantageous in view of production efficiency of the molding. The corner part of the molding is difficult to shape and to install, since an arm supporting the windshield thereon is switched to another arm at the corner part.

In Japanese Patent Laid-Open Publications 8019 to 8021 of 1988, the groove on the top of the molding is not deep enough to serve as a water drain channel efficiently.

In Japanese Patent Laid-Open publication 195032/1989 (U.S. Pat. No. 4,865,796), sharp edges of a top decorative portion have to be rounded in a separate step. Further the cut portion has polish different from the polish of the remaining decorative portion, which adversely affects external appearance of the top portion. Since depth of the groove cannot be changed as desired, the capacity of the groove as a water drain channel is very limited. Further, the molding is installed in the window opening of the vehicle body panel in a deformed manner, the molding easily comes out due to its internal stress. This problem is also experienced with the molding disclosed in Japanese Patent Laid-Open Publication 204713/1989 and 204714/1989.

SUMMARY OF THE INVENTION

It is therefore an object of this invention to provide an extruded windshield molding including water drain channels formed by changing the shape of the molding and to assure a good decorative appearance.

According to this invention, there is provided an automobile windshield molding comprises a pair of extruded side molding parts, a pair of extruded corner molding parts and an extruded upper molding part integral with and extending between the side and corner molding parts. Each of the side, corner and upper molding parts includes: an exterior wing adapted to cover a space, on the exterior side of the vehicle, between the window-opening periphery of the vehicle body panel and each of side, corner and upper edges of the windshield, the exterior wing including an inward wing portion for covering the peripheral edge of the windshield and an outward wing portion for covering the periphery of the vehicle body panel, the majority of the inward wing portion associated with each the side edge of the windshield being large in height to be spaced from the side peripheral surface of the windshield, such side inward wing portion having a first water drain channel which extends in and along such large-height part and opens inwardly of the window opening; and a connecting portion extending from an interior side of each the exterior wing through the space between the window-opening periphery of the vehicle body panel and each the edge of the windshield and terminating in a foot on the interior side of the vehicle body panel and a lip on the exterior side of the vehicle body panel.

There is proposed a method for producing a strip of an automobile windshield molding by using a molding device including dies. The method comprises: extruding molding material through a hollow portion defined by the dies; adjusting the shape of the hollow portion by moving the dies according to the shape of a molding to be made; and widening part of the hollow portion of the dies to increase height of an inward wing portion associated with a side edge of the windshield to form a water drain channel in and along the inward wing portion.

According to this invention, the inward wing portion associated with the side edge of the windshield smoothly rises to form an eves and wall, which define a sufficient space for a water drain channel. A strip of molding can be easily produced by extrusion process, and no cutting process is necessary to form the water drain channel. Thus the molding has an excellent external appearance and is very safe.

BRIEF DESCRIPTION OF THE DRAWINGS

FIG. 1 is a perspective view of a vehicle body having a windshield molding;

FIG. 3 is a cross-sectional view taken along line [X—X] *3—3* of FIG. 1;

FIG. 7 is a front view showing a molding device for extruding the windshield molding shown in FIGS. 1 to 6;

FIG. 10 is a perspective view of a windshield molding according to a second embodiment of this invention, showing the structure of a corner molding part;

FIG. 11 is a view similar to FIG. 3;

FIG. 12 is a cross-sectional view taken along line [Z—Z] *12—12* of FIG. 11.

DETAILED DESCRIPTION *OF THE PREFERRED EMBODIMENTS*

Figure 2:
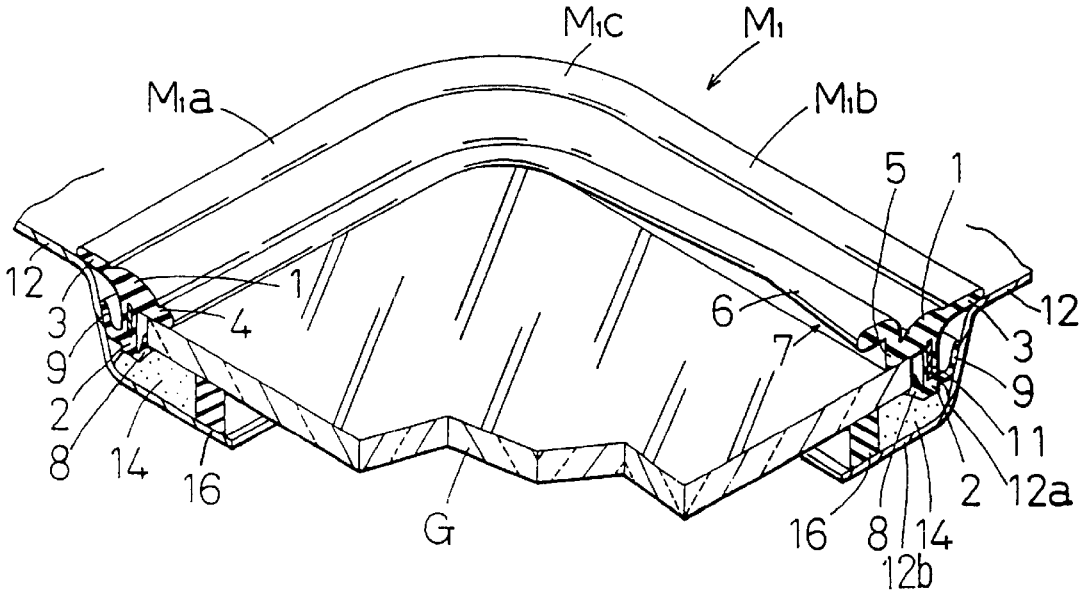
FIG. 2 is a perspective view of a windshield molding according to a first embodiment of this invention, showing the structure of a corner molding part.

As shown in FIG. 1, an extruded windshield molding M1 (hereinafter called as "molding M1") is attached to a peripheral edge of a windshield G, sealing the space between the windshield and a periphery of a window opening of a vehicle body panel. The molding M1 comprises an upper molding part M1a to be mounted between the upper edge of the windshield G and a roof portion of a body panel 12 of a vehicle, side molding parts M1b to be mounted between side edges of the windshield G and pillar portions of the body panel 12 of the vehicle body, and corner molding parts M1c for connecting the upper and side molding parts M1a, M1b. All of these molding parts M1a to M1c are extruded as one unit.

The molding M1 shown in FIGS. 2 to 6 is a strip in the *cross-sectional* shape of T, and is made of elastic material such as synthetic resin extruded *as an elongated member* by a molding device to be described later. The molding M1 comprises an exterior wing 1 adapted to cover a space, on the exterior side of the vehicle, between the window opening periphery of the body panel 12 and peripheral edge of the windshield G, and a connecting portion 2 extending from an interior side of the exterior wing 1. The connecting portion 2 is inserted in the space between the body panel 12 and the peripheral edge of the windshield G.

A strip of a metal foil 11 is embedded in the molding M1 at an area *of a vehicle* where the connecting portion extends from the interior side of the exterior wing 1.

The connecting portion 2 includes a foot 8 extending inwardly (toward the windshield G ) along the end thereof, and a flexible lip 9 extending outwardly (toward the vehicle body panel 12) along the end thereof. The foot 8 contacts with the windshield G.

The exterior wing 1 includes an outward wing portion 3 for flexibly covering the periphery of the vehicle body panel 12, and an inward wing portion 4 for flexibly covering the peripheral edge of the windshield G. Both the outward and inward wing portions [are] *branch the exterior wing into two* lip-shaped members. The peripheral edge of the windshield G is inserted in a space between the inward wing portion 4 and the foot 8 of the connecting portion 2.

Fundamentally, the molding M1 has a uniform cross-sectional shape throughout its whole [area] *length* except for the inward wing portions 4 at the side molding parts. Specifically, the cross-sectional shapes of the connecting portion 2, foot 8, flexible lip 9 and outward wing portion 3 are same throughout the side, upper and corner molding parts. This is because the difference of height between the upper surface of the windshield G and the upper surface of the body panel 12 is kept uniform *throughout the entire length of the side, upper and corner molding parts*. On the contrary, the inward wing portion 4 [between] *from* each corner molding part M1c [and] *to* each side molding part M1b rises gradually as described hereinafter.

The upper molding part M1a has a *uniform* cross-sectional shape *throughout its entire length* as shown in FIG. 3. The inward wing portion 4 from the corner molding part M1c to the side molding part M1b gradually [extends upwardly] *rises toward the outside of the vehicle*. Specifically, as shown in FIGS. 2 to 6, the inward wing portion 4 gradually rises to form a wall 5 and semi-cylindrical eaves 6 *from the corner to the outside*. The eaves 6 [is uniformly thick], *disposed inwardly, gradually and linearly rises toward the outside of the vehicle from the corner section to the side section so as to separate from the surface of the windshield G while keeping a uniform thickness. The wall 5 also rises in proportion to the height of the eaves 6*. The bottom of the inward wing portion 4, i.e. the bottom of the wall 5, is in close contact with the upper surface of the windshield G. Thus, an L-shaped space is defined between the upper surface of the windshield G, the wall 5 and the eaves 6, serving as a water drain channel 7.

Figure 5:
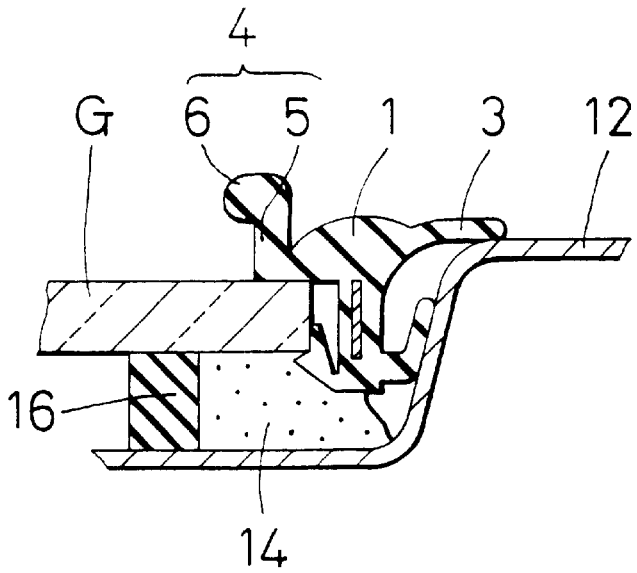
FIG. 5 is a cross-sectional view taken along line [$Y_2$—$Y_2$] *5—5* of FIG. 3.

The wall 5 *gradually rises from a midpoint of a corner section to the side section and* is highest at the upper portion of the side molding part M1b (as shown in FIG. 5), keeping its height to the end of the side molding part M1b. The eaves 6 laterally extends from the upper part of the wall 5 over the windshield G. The eaves 6 *has a uniform lateral length from a midportion of a corner section to the side section and* gradually becomes longer from the upper portion to the

*longer* end of the side molding part M1b *where the wall 5 maintains the maximum height*. Thus, the water drain channel 7 is gradually deepened*, as is the width of its opening. The size of the water drain channel 7 changes in width and depth in relation to each other*.

The molding M1 is attached to the windshield G and the vehicle body panel 12 as described below.

Firstly, the molding M1 is attached around the peripheral edge 11 of the windshield G. Between the upper and corner parts, the edge 11 of the windshield G is sandwiched between the foot 8 and the interior side of the inward wing portion 4. Each of the side edges of the windshield G is sandwiched between the foot 8 and the interior side of the inward wing portion 4. The corner molding parts M1c are curved according to a predetermined curvature, without any wrinkles at the curved portions*, despite a difference in the length along the curved direction,* because the molding M1 is increased thickness as described above.

A dam rubber 16 in a strip shape is applied around the edge of a flange 12*b* of the body panel 12. An adhesive 14 is applied around the dam rubber 16. Then the windshield G having the molding M1 mounted therearound is placed on the dam rubber 16. The windshield G is pressed toward the vehicle body, so that the foot 8 of the connecting portion 2 is fastened by the adhesive 14, and the flexible lip 9 of the connecting portion 2 is [L-shaped] *bent* to flexibly contact with a slanting wall 12a of the body panel 12 [, thereby fastening]. *A repulsion due to the bending causes* the molding M1 *to be fastened* firmly.

Figure 4:
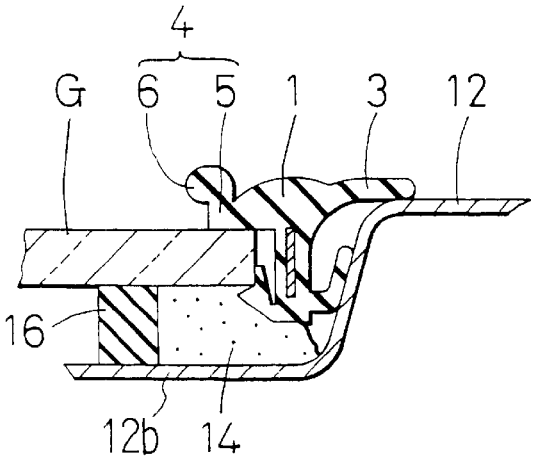
FIG. 4 is a cross-sectional view taken along line [$Y_1$—$Y_1$] *4—4* of FIG. 3.
Figure 6:
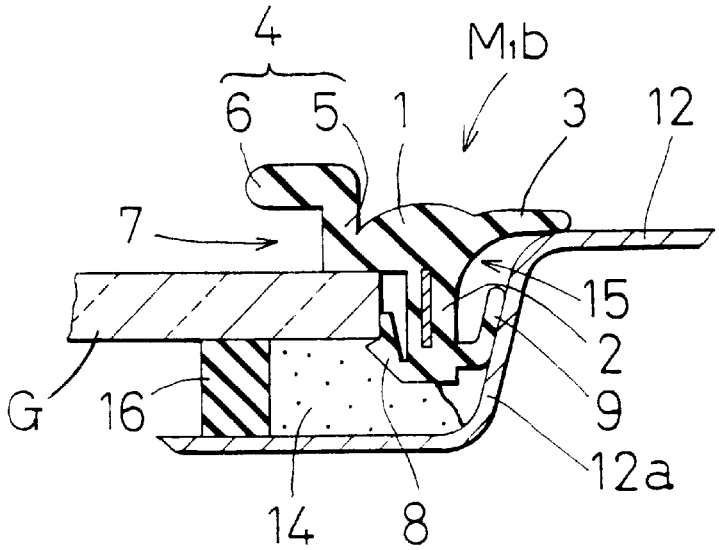
FIG. 6 is a cross-sectional view taken along line [$Y_3$—$Y_3$] *6—6* of FIG. 3.

The windshield G is mounted on the flange 12b of the body panel 12 to be substantially flush with the surface of the body panel 12. The outward wing portion 3 of the molding M1 is in close contact with the body panel 12 throughout the whole molding parts M1a, M1b, M1c. From the corner to the side molding parts, the inward wing portion 4 gradually extends upwardly as shown in [FIG. 4. FIGS. 5 and 6 show that the inward wing portion 4 gradually becomes taller to become tallest at the center of the side molding part toward the end of the side molding part] *FIGS. 4, 5 and 6. The upper molding M1a, as shown in FIG. 3, has a uniform cross-sectional shape throughout the entire length thereof, without any heightened part. From a midpoint in a corner section to a side section, as shown in FIG. 4, the inward wing portion 4 gradually rises upward and becomes higher so as to form a large-height part. In the side molding part M1b, in FIGS. 5 and 6, the maximum large-height part is formed and maintained throughout the central portion toward the lower portion of the side molding part M1b*.

Rain water is guided on the windshield G along the inward wing portion of the molding M1 and the water drain channel 7 to be discharged to a predetermined position.

It is also possible to attach the molding M1 after the windshield G is installed in the window opening of the vehicle body panel.

A molding device for producing the foregoing molding M1 will be described with reference to FIGS. 7 to 9.

The molding device comprises three dies i.e. first to third dies 22, 23, 24. These dies have openings for extruding plastic material, being juxtaposed one another in the direction for extruding the molding, i.e. the direction perpendicular to the plane of FIG. 7.

The first die 22 is stationary, having an opening 21 which is shaped [according] *so as* to *cover* the cross-sectional shape of the molding M1. A part of the opening 21 is square-shaped according to the shape of the inward wing portion 4 [for] *covering* the upper, corner and side molding parts M1a, M1c, M1b, as shown in FIG. 9.

The second die 23 is positioned in front of the first die 22, being movable up and down in parallel to the first die 22 by a pair of guides 25.

The third die 24 is positioned in front of the second die 23, being movable horizontally and in [parallel] *the perpendicular direction* to the *direction of movement of the* second die 23 by a pair of guides 26.

The second die 23 is a substantially rectangular plate, of which one corner is cut according to the shape of the [upper edge] *eaves 6 and wall 5* of the inward wing portion 4. *That cut corner of the second die 23 is put on the part of the opening 21 corresponding to the inward wing portion 4 of the first die 22.* To form the inward wing portion 4 of the side molding part M1b, the second die 23 is moved in parallel [to the first die 22] so that the cut corner of the second die 23 covers the part (corresponding to the inward wing portion 4) of the opening 21 of the first die 22. Therefore, the area of the opening 21 (corresponding to the inward wing portion 4) is gradually changed to heighten the inward wing portion 4 of the side molding part M1b.

A lever 23*a* extends from an upper edge of the second die 23 to be connected to a converter 29, which is driven by a motor [25] *27* to convert the rotary motion of the motor [25] *27* to the rectilinear motion. The motor 27 causes the second die 23 to reciprocate between the position for forming the upper molding part (FIG. 8) and the position for forming the side molding part (FIG. 7).

The third die 24 is a long slender plate whose righthand edge (FIG. 7) is cut semi-circular according to the shape of the eaves 6 of the inward wing portion 4. The third die 24 is moved in the opening 21 of the first die 22 at the part corresponding to the inward wing portion 4, [thereby forming] *so that* the eaves 6 of the inward wing portion 4 *changes its length. This movement is caused by operation of a motor 28 which drives a converter 31 which converts rotary motion of the motor 28 to rectilinear motion.*

The following describe how the molding device operates to produce the molding M1.

The molding M1 is extruded by the molding device in the following order: a side molding part M1b, a corner molding part M1c, an upper molding part M1a, a corner molding part M1c, and a side molding part M1b.

To extrude the side molding part M1b, the second and third dies 23, 24 are arranged for the first die 22 as shown in FIG. 7, so that the opening 21 of the first die 22 kept widest. A strip of metal foil is supplied to the opening 21 of the first die 22 at the portion corresponding to the connecting portion 2 of the molding M1. The end of the side molding part M1b, having the cross-sectional shape shown in FIG. 6, is firstly extruded. The side molding part M1b has the inward wing portion 4 whose wall 5 is highest and whose eaves 6 is longest to form the water drain channel 7 having the largest cross-sectional area.

The side molding part M1b is extruded to a predetermined length. Then the third die 24 is moved in the direction shown by an arrow Q. As the third die 24 is advanced into the opening 21 of the first die 22 to further shield part of the opening 21 according to the shape of the *eaves 6 of the* inward wing portion 4. When the third die 24 reaches the position shown by a dash-and-double-dot line, the side molding part M1b is extruded in the shape as shown in FIG. 5. *At this point, multiple dies* (*initially all three dies 22–24 and then just the first die 22 and second die 23*) *have been disposed at the same position while the outer surface of the exterior wing and the top surface of the eaves were formed.* After this, the second die 23 is moved in the direction shown by an arrow P to form the side and corner molding parts M1b, M1c having the cross-sectional shape as shown in FIG. 4. The [cross-sectional area] *height* of the *wall 5 is gradually reduced so that the* water drain channel 7 is gradually reduced in proportion to the decrease of the height of the inward wing portion 4.

Figure 8:
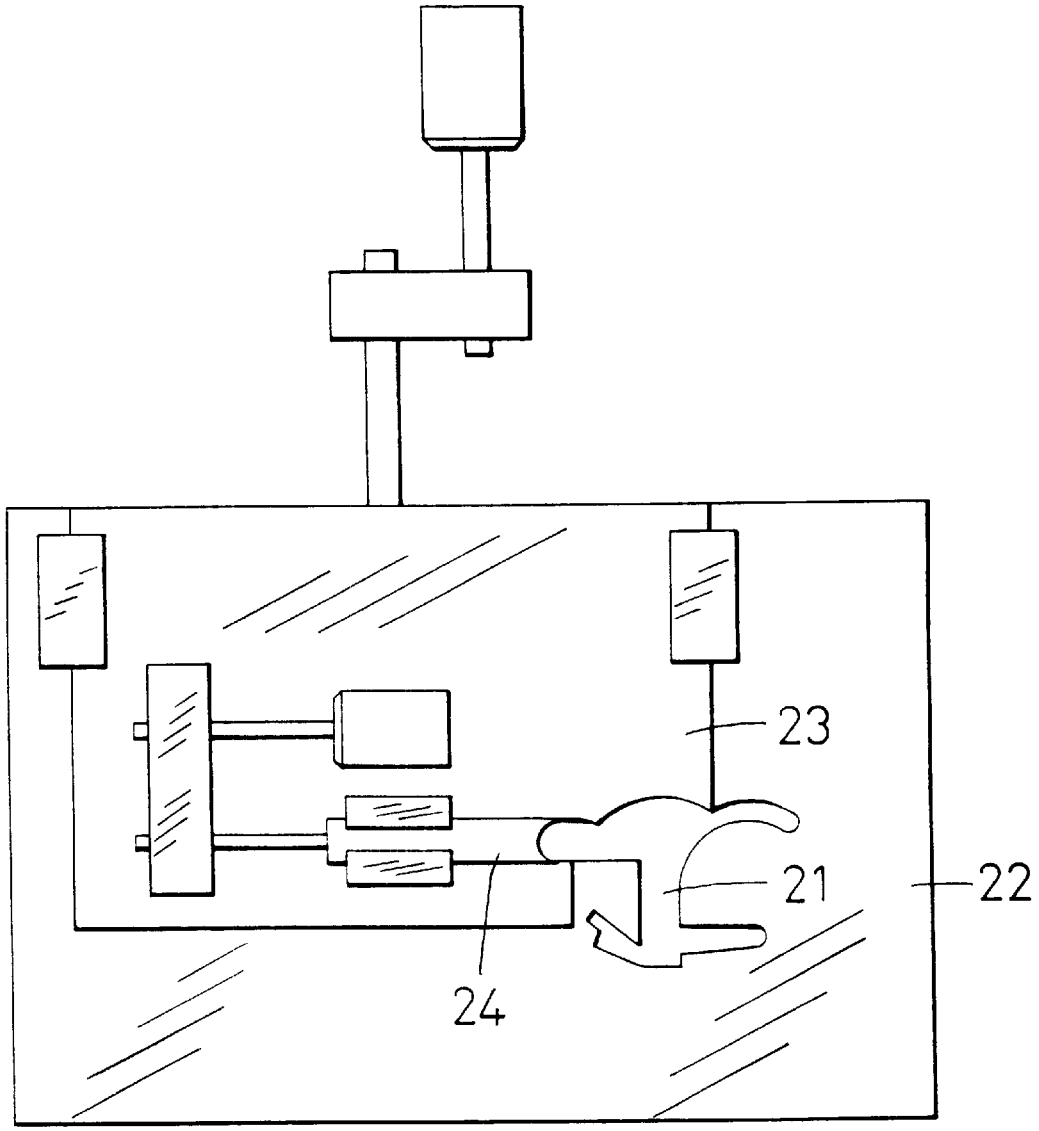
FIG. 8 is a front view of the molding device of FIG. 7, showing how dies are moved.
Figure 9:
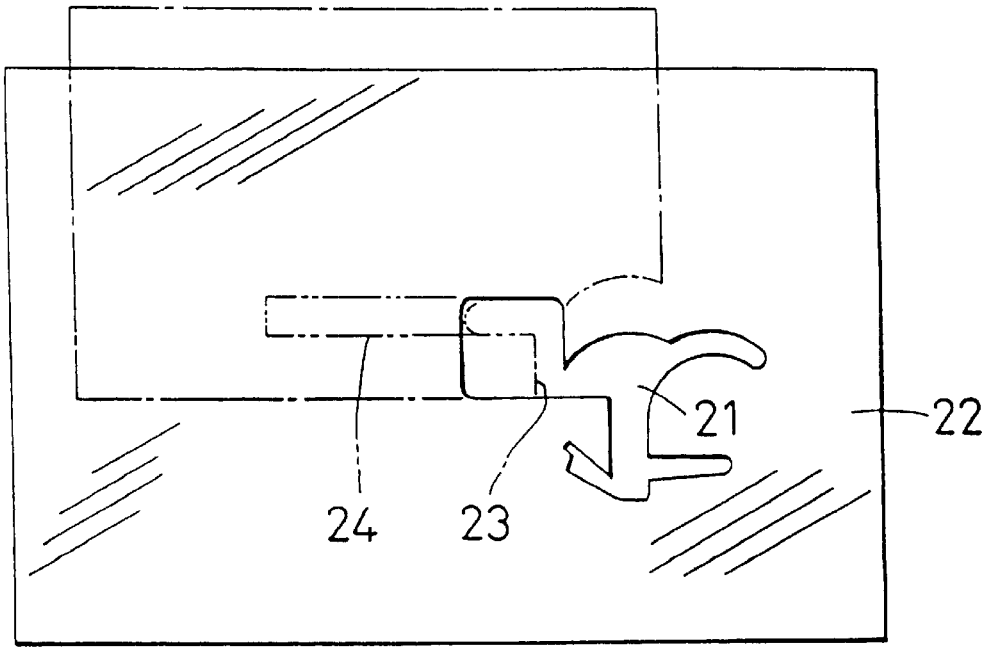
FIG. 9 shows basic shapes of the dies of the molding device of FIG. 7.

When the corner molding part M1c is completely extruded, the second die 23 stops at its destination as shown in FIG. 8. Under this condition, the water drain channel 7 disappears from the inward wing portion 4 of the molding M1. The opening 21 of the first die 22 corresponds to the cross-sectional shape of the upper molding part M1a. Thereafter, the molding device extrudes the upper molding part M1a to a predetermined length.

After completion of the upper molding part M1a, the corner and side molding parts M1c, M1b are extruded in the sequence opposite to the above-mentioned sequence. *Consequently, in FIG. 7, the second die is moved in the direction shown by the arrow R and third die is moved in the direction shown by the arrow S.* Thus, the molding M1 will be extruded in the shape of a [strip] *single piece and the eaves will have a uniform outer contour appearance.*

FIGS. 10 to 12 show a molding M2 according to a second embodiment of this invention. In these drawing figures, the members identical to those of the first embodiment are assigned a mark (').

The outward wing portion 3' of the exterior wing 1' is downwardly pulled by a piece 30, which extends from the connecting portion 2 of the molding M2. The pulled portion, i.e. concave portion, of the exterior wing 1' serves as a second water drain channel 32. This second water drain channel 32 is formed throughout the molding M2 to guide rain water from the body panel 12' at the roof side when the motor vehicle is decreasing its speed or stops, thereby assuring a good view for the driver.

As shown in FIGS. 10 and 12, the inward wing portion 4' gradually rises in the shape of arc between the corner molding part [M1c] *M2c* and the side molding part [M1b] *M2b*, being formed as a wall 5' an eaves 6'. The wall 5' is slightly inclined toward the upper surface of the windshield G. The space defined between the eaves 6' and the wall 5' is somewhat depressed in the shape of L, serving as a water drain channel 7'. *Reference numeral 34 designates a wire portion, while reference numeral 35 designates a hollow portion.*

The eaves 6' of the inward wing portion 4' is uniform in shape and thickness, contrary to the eaves 6 of the first embodiment.

The molding M2 of this embodiment is as advantageous as the molding M1 of the foregoing embodiment. The molding M2 can be attached around the windshield G and then installed in the window opening of the body panel of the vehicle. Otherwise, the windshield G is firstly installed in the window opening of the body panel. Secondly, the molding M2 is installed with the connecting portion inserted into the space between the windshield G and the body panel 12.

A molding device for producing the molding M2 will be described hereinafter.

Figure 13:
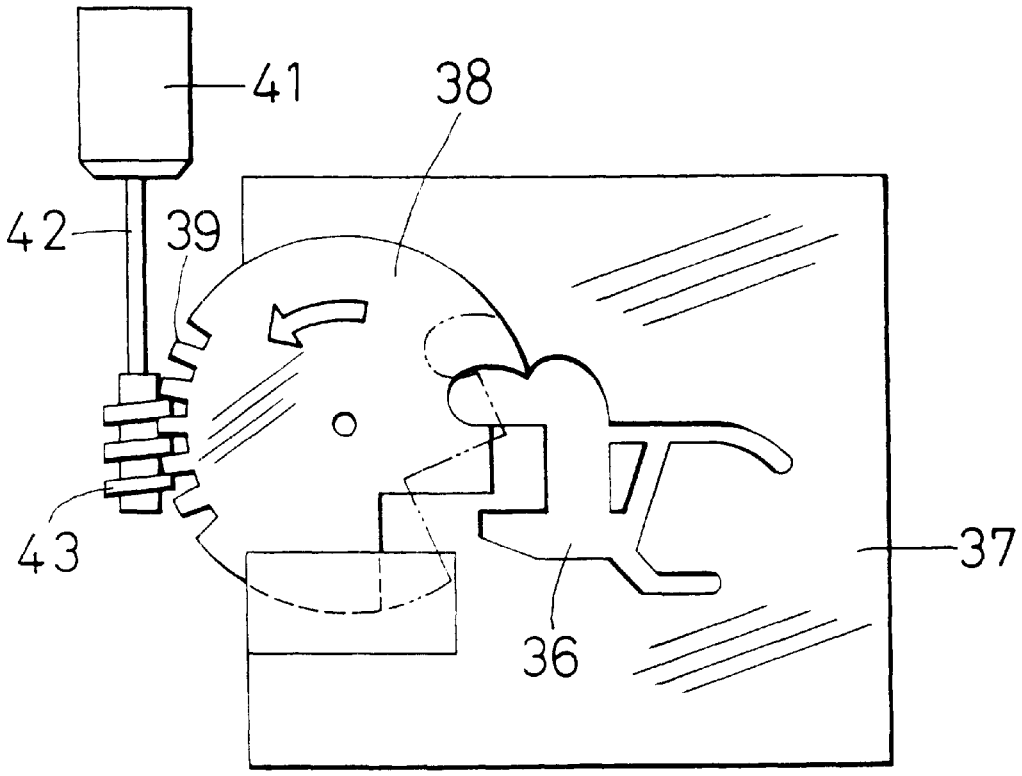
FIG. 13 is a front view of a molding device for extruding the windshield molding shown in FIGS. 10 to 12.

As shown in FIG. 13, the molding device comprises a first die 37 and a second die 38, both of which have openings corresponding to the cross-sectional shape of the molding M2. The first and second dies 37, 38 are juxtaposed in the direction for extruding the molding M2 (i.e. in the direction perpendicular to the plane of FIG. 13). The first die 37 is stationary, and the second die 38 is angularly movable in front of the first die 37. The first die 37 has the opening 36 through which the molding M2 is extruded. Part of the opening 36 is shaped according to the cross-sectional shapes of the inward wing portion 4' of the upper, corner and side molding parts [M1a, M1b, M1c] *M2a M2c, M2b*.

The second die 38 is substantially disc-shaped. The peripheral edge of the second die 38 is partially cut in the shape of the eaves 6' and wall 5' of the inward wing portion 4'. The opening 36 of the first die 37 has a side corresponding to the wall 5' which is in contact with the surface of the windshield G. The cut portion of the second die 38 is superimposed over the area of the opening 36 corresponding to the inward wing portion 4'. When the second die 38 is angularly moved, the area of the opening 36 corresponding to the inward wing portion 4' is changed to let the inward wing portion 4' rise as described above.

The second die 38 is formed with a rack 39 on part of the circumference thereof. A pinion 43 engaged with the rack 39 is connected to a motor 41 via a lever 42. The driving force of the motor 41 causes the second die 38 to reciprocate the position corresponding to the upper molding part and the position corresponding to the side molding part shown in FIG. 13.

Operation of this molding device for the molding M2 is substantially similar to the operation of the device for the molding M1 except that the second dies 38 is angularly moved and that no third die is used. Therefore, the description on the molding device will be omitted here.

In the foregoing two embodiments, the water drain channels 7' can be formed at desired positions and in a desired size. For instance, the water drain channel will be sometimes formed only at the upper portions of the side molding parts. In such case, the decorative function of the molding will not be affected at all.

When the exterior wing of the molding is thinned to decrease the difference of height between the upper surface of the body panel and the upper surface of the windshield, wrinkles may be unfortunately formed at the corner molding parts. However such wrinkles cannot be formed since the molding is made thicker as described on the foregoing embodiment, thereby assuring a reliable installation of the molding on the vehicle.

This invention is also applicable to install a rear window.

In the foregoing embodiments, the inward wing portion covering the peripheral edge of the windshield is made to gradually rise between the corner molding part to the side molding part, thereby forming a water drain channel in a space between the inward wing portion and the upper surface of the windshield. Since all the side, corner, upper, corner and side molding parts are integrally extruded, the water drain channel can be formed very easily. The molding of this invention can assure a safety, good appearance and decorative functions.

What is claimed is:

1. An automobile windshield molding [for] sealing [the] *a* space between a windshield and a periphery of a window opening of a vehicle body panel, said *automobile windshield* molding *being* [comprising a pair of] extruded [side molding parts, a pair of extruded corner molding parts and an extruded upper molding part integral with and extending between said side and corner molding parts, each of said side, corner and upper molding parts] *in a single piece, said automobile windshield molding comprising* [including]:

[(a)]an exterior wing adapted to cover [a] *said* space[,] on [the] *an* exterior side of the vehicle *body panel*, [between the window-opening periphery of the vehicle body panel and each of side, corner and upper edges of the windshield, said exterior wing including] *comprising* an inward wing portion *that is adapted to cover* [for covering the] *a* peripheral surface of the windshield and an outward wing portion *that is adapted to cover* [for covering the] *a* periphery of the vehicle body panel, said [interior] *inward* wing portion having an eaves *integral with said inward wing portion* which protrudes out over said windshield; and

[(b)]a connecting portion extending from an interior side of [each] said exterior wing *and adapted to extend* through [the] *said* space, [between the window-opening periphery of the vehicle body panel and each said edge of the windshield and terminating in a foot on the interior side of the vehicle body panel and a lip on the exterior side of the vehicle body panel] *wherein a combined cross section of the connecting portion and the outward wing portion is uniform along an entire length of the molding*;

wherein said eaves [has a] *and said inward wing portion have* bottom [surface] *surfaces* in direct contact with said windshield at an upper molding part [which] *said eaves bottom surface* gradually becomes spaced further and further from said [windshield along said side molding parts,] *inward wing portion bottom surface* so as to form [a] first water drain [channel extending along each of said side molding parts] *channels* between said bottom surface of said eaves and said windshield, *said first water drain channels beginning approximately at first and second corner molding parts of said automobile windshield molding and extending toward respective first and second side molding parts of said automobile windshield molding; and*

*wherein a distance by which said eaves extends from said connecting portion in a direction parallel to said peripheral surface gradually increases along said first and second side molding parts.*

[2. An automobile molding according to claim 1, wherein each of said side, corner and upper molding parts has a second water drain channel on the outward wing portion of said exterior wing.]

3. An automobile windshield molding according to claim 1, wherein said eaves has a top surface and a constant thickness measured between said top surface and said bottom surface.

[4. An automobile windshield molding according to claim 1, wherein a distance by which said eaves protrudes out over said windshield gradually increases along each side molding part to thereby increase a depth of said water drain channel.]

5. A method for producing a strip of an automobile windshield molding having *first and second* side molding parts, *first and second* corner molding parts, and an upper molding part each with an inward wing portion having a windshield-contacting surface and an eaves for projecting out over an automobile windshield, said method comprising the steps of:

(a) extruding molding material through an opening in a first die while blocking off part of said opening with a second die to thereby form [a] *said* first side *molding* part [of said molding], said first side *molding* part being configured such that said eaves *of said first side molding part* has a bottom surface which is displaced out of alignment with [said] *the* windshield-contacting surface *of the inward wing portion of said first side molding part*;

(b) continuing to extrude said molding material while moving said second die relative to said first die in a first direction, thereby displacing said eaves *of said first side molding part* gradually toward alignment with [said] *the* windshield-contacting surface *of the inward wing portion of said first side molding part*;

(c) [extruding an upper portion of said]*continuing to extrude the* molding [strip] *material* wherein said second die is positioned such that the bottom surface of said eaves *of said upper molding part* is in the same plane with and becomes coextensive with [said windshield contacting ] *the windshield-contacting* surface *of the inward wing portion of said upper molding part*; and (d) continuing to extrude said molding material while moving said second die in a second direction relative to said first die, to thereby gradually displace said eaves away from [said] *the* windshield-contacting surface *of the inward wing portion of said second side molding part*, and to thereby form [a] *said* second side *molding* part of said molding.

6. [The]*A* method according to claim 5, further comprising a step of adjusting a distance by which said eaves [protrudes] *of said first and second side molding parts project* out over said windshield by moving a third die relative to said first and second dies [during extrusion].

7. A method according to claim 5, wherein said second die is moved relative to said first die by translating the second die along guides.

8. [The]*A* method according to claim 5, wherein said second die is moved relative to said first die by rotating said second die about a pivot axis.

*9. An automobile windshield molding sealing a space between a windshield and a periphery of a window opening of a vehicle body panel, said molding comprising extruded side molding parts, extruded corner molding parts, and an extruded upper molding part integral with and extending from said corner molding parts, each of said side parts, said corner parts, and said upper molding part including:*

*(a) an exterior wing adapted to cover said space at an exterior side of the vehicle body panel and at each of side, corner, and upper edges of the windshield, said exterior wing including an inward wing portion for covering a peripheral surface of the windshield and an outward wing portion for covering the periphery of the vehicle body panel, said inward wing portion having an eaves which protrudes out over said windshield; and*

*(b) a connecting portion extending from an interior side of said exterior wing through the space between the window opening periphery of the vehicle body panel and said edges of the windshield;*

*wherein said eaves and said inward wing portion have bottom surfaces in direct contact with said windshield at said upper molding part, and said eaves bottom surface gradually rises and becomes spaced progressively farther from said inward wing portion bottom surface beginning approximately at said corner molding parts and extends along said side molding parts so as to form a first water drain channel extending along portions of said corner molding parts and along said side molding parts and between said bottom surface of said eaves and said windshield, said spaced eaves forming a top surface and a side surface of said first water drain channel; and*

*wherein a distance by which said eaves extends from said connecting portion in a direction parallel to said peripheral surface gradually increases along said side molding parts.*

*10. An automobile windshield molding according to claim 9, wherein an inward edge of said eaves has a uniform outer contour appearance from the side molding parts and the corner molding parts to the upper molding part throughout the entire molding.*

*11. An automobile windshield molding according to claim 9, wherein said inward wing portion of said side molding parts further comprises an inclined wall such that said first water drain channel is defined between said eaves of said side molding parts and said inclined wall.*

*12. An automobile windshield molding according to claim 9, wherein said inward wing portion of said side molding parts further has a wall cooperating with said eaves for forming the first water drain channel.*

*13. An automobile windshield molding according to claim 12, wherein said wall is in contact with the peripheral surface of the windshield throughout the entire molding and said wall gradually rises from the corner molding parts to the side molding parts.*

*14. An automobile windshield molding according to claim 9, wherein said eaves have a top surface and a bottom surface and a constant thickness measured between said top surface and said bottom surface.*

*15. An automobile windshield molding according to claim 9, wherein said connecting portion of each of said side, corner, and upper molding parts has a foot which extends towards the windshield.*

*16. An automobile windshield molding according to claim 9, wherein said connecting portion of each of said side, corner, and upper molding parts has a lip which extends towards the vehicle body panel.*

*17. An automobile windshield molding according to claim 1, wherein the peripheral surface of said windshield defines a bottom of said first water drain channels.*

*18. An automobile windshield molding according to claim 9, wherein the peripheral surface of said windshield defines a bottom of said first water drain channel.*

*19. An automobile molding according to claim 1, further comprising a second water drain channel on an outward wing portion of said exterior wing.*

*20. An automobile windshield molding sealing a space between a windshield and a periphery of a window opening of a vehicle body panel, said automobile windshield molding being extruded in a single piece and comprising side molding parts, corner molding parts and an upper molding part, each molding part comprising:*

*an exterior wing adapted to cover said space on an exterior side of the vehicle body panel, comprising an inward wing portion that is adapted to cover a peripheral surface of the windshield and an outward wing portion that is adapted to cover a periphery of the vehicle body panel, said inward wing portion having an eaves integral with said inward wing portion which protrudes out over said windshield; and*

*a connecting portion extending from an interior side of said exterior wing and adapted to extend through said space;*

*wherein said eaves and said inward wing portion have bottom surfaces in direct contact with said windshield at the upper molding part, said eaves bottom surface gradually becomes spaced further and further from said inward wing portion bottom surface along said side molding parts so as to form first water drain channels between said bottom surface of said eaves and said windshield, and*

*wherein a distance by which said eaves extends from said connecting portion in a direction parallel to said peripheral surface gradually increases along said side molding parts.*

*21. An automobile windshield molding according to claim 1, wherein said automobile molding maintains a substantially constant angle between the connecting portion and the exterior wing along the entire length of said automobile molding when installed in the vehicle.*

*22. An automobile windshield molding according to claim 10, wherein said automobile molding maintains a substantially constant angle between the connecting portion and the exterior wing along the entire length of said automobile molding when installed in the vehicle.*

*23. An automobile windshield molding according to claim 20, wherein said automobile molding maintains a substantially constant angle between the connecting portion and the exterior wing along the entire length of said automobile molding when installed in the vehicle.*

* * * * *